United States Patent [19]
Rauchfuss et al.

[11] Patent Number: 6,114,469
[45] Date of Patent: Sep. 5, 2000

[54] RUBBER COMPOSITIONS CONTAINING ZINC HEXASULFIDE COMPLEXES

[75] Inventors: Thomas Bigley Rauchfuss, Urbana, Ill.; Otto William Maender, Copley; Frederick Ignatz-Hoover, Elyria, both of Ohio

[73] Assignee: Flexsys America L.P., Akron, Ohio

[21] Appl. No.: 09/134,978

[22] Filed: Aug. 17, 1998

[51] Int. Cl.[7] .............................. C08C 19/20; C08K 3/04
[52] U.S. Cl. .................... 525/343; 525/348; 524/571; 524/492; 524/495
[58] Field of Search ................................ 524/571, 575, 524/575.5, 495; 525/343, 348

[56] References Cited

U.S. PATENT DOCUMENTS 5,430,117  7/1995  Kawasaki et al. .................. 524/474

FOREIGN PATENT DOCUMENTS 1236055  6/1917  United Kingdom .

OTHER PUBLICATIONS

Dev et al. "Direct Approaches to Zinc Polychalcogenide Chemistry: $ZnS_6(N-MeIm)_2$ and $ZnSe_4(N-MeIm)_2$", J. Am. Chem. Soc. 1190, 112 pp. 6385–6386.

*Primary Examiner*—Tae Yoon
*Attorney, Agent, or Firm*—Louis A. Morris

[57] ABSTRACT

Rubber compositions which contain a complex of zinc hexasulfide with an amine, together with a vulcanization accelerator exhibit favorable vulcanization behavior, and their vulcanizates show improved properties.

14 Claims, No Drawings

RUBBER COMPOSITIONS CONTAINING ZINC HEXASULFIDE COMPLEXES

BACKGROUND OF THE INVENTION

1. Field of the Invention

This invention relates to vulcanizable rubber compositions which combine vulcanizable rubber with effective amounts of a complex of zinc hexasulfide and an amine and of co-agent which comprises one or more vulcanization accelerators.

2. Related Art

Complexes of zinc hexasulfide with an amine are described in a publication, "Direct Approaches to Zinc Polychalcogenide Chemistry: $ZnS_6(N-MeIm)_2$ and $ZnSe_4(N-MeIm)_2$," by Dev, Ramli, Rauchfuss and Stern, JACS 112, 6385 (1990). The article describes the preparation and properties of the complexes, and suggests that they are "relevant to the action of zinc catalysts for the addition of polysulfur radicals to polyolefins in the vulcanization process."

Experiments in which these complexes were used as accelerators in standard rubber formulations were unsuccessful; instead, the effect of the complexes was to produce extremely slow cure (vulcanization) times, and the complexes produced the same effect as if elemental sulfur had been added. Thus, the expected "zinc catalyst" effect was not achieved and the vulcanizates required impractically long cure times.

Further experiments showed, surprisingly, that the inclusion of a co-agent, in effective amounts, gave compositions which vulcanized much faster, more quickly even than conventional formulations. Specifically, the additional presence of a vulcanization accelerator in an amount of from 0.1 to 10 parts by weight per 100 parts by weight of vulcanizable rubber, proved to be effective in producing vulcanizates with fast cure rates and superior physical properties.

SUMMARY OF THE INVENTION

The present invention is directed to vulcanizable rubber compositions, which compositions comprise 100 parts by weight of vulcanizable rubber, from 0.01 to 10 parts, preferably 0.1 to 5.0, by weight of a complex of zinc hexasulfide and an amine of from 3 to 24 carbon atoms, and as a co-agent, from 0.1 to 10, preferably 0.5 to 5, parts by weight of an accelerator of rubber vulcanization.

Rubber accelerators that can be used as co-agents include 2-mercaptobenzothiazole (MBT) and benzothiazolyl disulfide (MBTS); sulfenamide accelerators, such as N-cyclohexyl-2-benzothiazolesulfenamide (CBS), N-t-butyl-2-benzothiazolesulfenamide (TBBS), 2-(4-morpholinothio)benzothiazole and N,N-dicyclohexyl-2-benzothiazolesulfenamide; sulfenimides, such as N-t-butyl-N,N-di-(2-benzothiazolyl)sulfenimide, and guanidines, such as diphenylguanidine (DPG) and di-o-tolylguanidine (DOTG). Preferred are the sulfenamides. When MBT or MBTS are used, it is preferred to include an amine compound as well, such as, for instance a guanidine, urea or an amine antidegradant. These conventional rubber accelerators are present in the amount of from 0.1 to 10 parts by weight, preferably 1.0 to 5.0 parts by weight per 100 parts by weight of vulcanizable rubber. Other, less conventional accelerators can be used, as well, such as those in which the benzothiazyl radical is replaced with other heterocycles, including triazinyl, pyridyl, pyrimidyl, pyrazyl, pyridazyl, quinolyl, lepidyl and the like. They are used in the same amounts as the conventional accelerators.

Complexes of zinc hexasulfide and an amine that are effective in the compositions of the invention include zinc hexasulfide which has been complexed with an amine of from 3 to 24 carbon atoms. Preferred amines include tertiary amines and di-tertiary amines. Among these preferred amines are N,N,N',N'-tetramethylethylenediamine, 1,1,3,3-tetramethylguanidine, 1-butylimidazole, 1,2-dipiperidinoethane, 1,2-dimorpholinoethane, 1,2-di-(N-methylpiperazino)ethane, N-methylimidazole, 1-benzyl-2-methylimidazole, 1,2-dimethylimidazole, N-butylimidazole, N-3-aminopropylimidazole, N-vinylimidazole, N-cyclohexyl-N',N',N",N"-tetramethylguanidine, and 4-dimethylaminopyridine.

Vulcanizable rubbers that can be used in the compositions of the invention include natural rubber, synthetic polyisoprene, polybutadiene, copolymers of butadiene with styrene (SBR) or acrylonitrile (NBR), butyl rubber, halobutyl rubber, halogenated copolymers of isobutylene with p-methyl styrene, ethylene-propylene diene monomer rubber (EPDM), polychloroprene, and blends of two or more of them.

Other conventional rubber compounding materials can be included as well, such as zinc oxide, stearic acid, antidegradants, fillers, reinforcers (such as carbon black and silica), softeners, retarders, oils, pre-vulcanization inhibitors, post-vulcanization stabilizers and the like, all of which are well known to those skilled in the art. The various ingredients are mixed with conventional rubber mixing equipment such as rubber mills and internal mixers such as Banbury mixers and mixing extruders.

The compositions of the invention can be formed into articles and vulcanized, usually in a mold under pressure, to produce tires, hose, belts and the like.

The rubber portion of the compositions of the invention may also be in the form of a latex, in which case, the other ingredients are added in the form of dispersions or emulsions. These compositions can be processed to produce film, thread or foam, and vulcanized with steam, hot water or hot air.

Evaluation of the compositions of the invention is performed on samples which have been vulcanized for sufficient time at vulcanizing temperatures, using test methods well known in the art.

The zinc hexasulfide amine complexes of the invention can be made (as shown in JACS 112, 6385) by reacting zinc powder, sulfur and a molar excess of the appropriate amine at an elevated temperature; then cooling the reaction product to room temperature and diluting with ethanol. The product appears, on cooling, as a yellow powder which is recovered by filtration. While the zinc hexasulfide amine complexes can be made by this general process, it is often easier to produce one complex from another by amine substitution, whereby the desired amine is reacted with a completed complex, displacing the amine from the complex and substituting the desired amine thereon.

The vulcanizable rubbers and the conventional vulcanization accelerators are all commercially available. Preparation of sulfenimides based on other heterocycles can be found in U.S. Pat. No. 5,079,305. Sulfenamides based on these heterocycles are described, along with their preparation, in European publications 643,702; 643,703 and 644,881.

DETAILED DESCRIPTION

To demonstrate the use of the compositions of the invention, a number of rubber compositions were prepared and tested. The behavior of the compositions during vulcanization were observed, and the properties of their vulcanizates were measured in accordance with standard ASTM procedures for rubber.

Parameters which characterize vulcanization were taken from ODR (oscillating disc rheometer) cure curves ("rheographs"), which were obtained for vulcanization at 150° C. and/or 160° C. The parameters Rmin and Rmax are the minimum rheometer torque (before the onset of vulcanization) and the maximum rheometer torque (due to vulcanization), respectively. The parameter t2 is the time required for an increase (over Rmin) in rheometer torque of 2.2 dNm joule (2.0 in-lb); t25 is the time required for the occurrence of 25 percent of the increase in torque due to vulcanization (time at which torque equals (Rmax-Rmin) 0.25+Rmin); t90 is the time required for the occurrence of 90% of the increase in torque due to vulcanization (time at which torque equals (Rmax-Rmin) 0.9+Rmin).

The invention will be better understood by reference to the following examples in which all parts are parts by weight per 100 parts by weight of rubber (phr) and all temperatures are in degrees Celsius, unless otherwise specified.

EXAMPLE 1

In order to demonstrate the advantage of the instant invention as it applies to compositions of natural rubber, the zinc hexasulfide complexes and co-agents were incorporated into a formulation intended for use as a "skim stock" to be calendered onto steel cord for use in tires.

A master batch was first prepared by mixing the following ingredients in a Banbury mixer:

| Ingredient | Parts by Weight |
| --- | --- |
| Natural rubber, SMR-L | 90.0 |
| Polyisoprene, NATSYN ® 2200 | 10.0 |
| Carbon black, N-326 | 68.0 |
| Oil, Sundex 8125 | 4.0 |
| Resin, Piccopale ® 100 SF | 3.0 |
| Zinc oxide | 8.0 |
| Stearic acid | 1.5 |
| Antiozonant 6PPD | 1.5 |
| Resin, Resimene ® S-72 | 2.0 |
| CTP, SANTOGARD ® PVI | 0.25 |
| Total | 188.25 |

As shown in Table 1, various other ingredients were added (on a mixing mill) and the resulting compositions were tested for scorch safety (Mooney Viscometer) and cure behaviour (Oscillating Disc Rheometer "ODR"). The vulcanizates were tested for a variety of physical properties, using standard ASTM test procedures. Results are set forth in Table II.

MOR is 2-(4-morpholinothio)benzothiazole. TBSI is N-t-butyl-N,N-di-(2-benzothiazolyl)sulfenimide. DCBS is N,N'-dicyclohexyl-2-benzothiazolesulfenamide. Complex A is zinc hexasulfide complexed with tetramethylethylenediamine. TMTD is tetramethylthiuram disulfide.

Stress-strain data were obtained on samples which were vulcanized, in each instance, for t90+5 minutes at 150° C. Die C tear tests were run according to ASTM D624-91, at 24° C. and at 100° C.

TABLE I

| Composition | 1 | 2 | 3 | 4 | 5 | 6 | 7 | 8 | 9 |
| --- | --- | --- | --- | --- | --- | --- | --- | --- | --- |
| Masterbatch | 188.25--------------------------------------------------------------------------> | | | | | | | | |
| MOR | 0.8 | 0.8 | 0.8 | — | — | — | — | — | — |
| TBSI | — | — | — | 0.8 | 0.8 | 0.8 | — | — | — |
| DCBS | — | — | — | — | — | — | 0.8 | 0.8 | 0.8 |
| INSOLUBLE SULFUR | 4.5 | 4.1 | 4.1 | 4.5 | 4.1 | 4.1 | 4.5 | 4.1 | 4.1 |
| COMPLEX A | — | 0.3 | — | — | 0.3 | — | — | 0.3 | — |
| TMTD | — | — | 0.3 | — | — | 0.3 | — | — | 0.3 |
| Mooney Scorch @ 121° C. | | | | | | | | | |
| Min. Viscosity, Mµ | 45.1 | 49.4 | 49.4 | 48.8 | 49.4 | 49.5 | 47.8 | 49.2 | 49.4 |
| t5, Minutes | 52.8 | 28.4 | 23.2 | 50.8 | 29.2 | 19.7 | 58.9 | 32.5 | 20.2 |
| t35, Minutes | 66.6 | 35.7 | 27.4 | 62.1 | 35.5 | 21.6 | 70.1 | 41.9 | 21.9 |
| ODR @ 150° C. | | | | | | | | | |
| Max. Torque, dNm | 52.4 | 56.1 | 60.7 | 55.4 | 57.0 | 60.7 | 53.4 | 55.2 | 56.5 |
| Min. Torque, dNm | 7.3 | 7.9 | 7.7 | 7.8 | 8.0 | 7.8 | 8.0 | 8.0 | 7.8 |
| t2, Minutes | 5.6 | 4.1 | 3.0 | 5.0 | 4.1 | 2.9 | 6.3 | 4.3 | 2.9 |
| t25 Minutes | 10.9 | 7.0 | 4.0 | 10.0 | 6.9 | 3.7 | 11.6 | 8.5 | 3.7 |
| t25-t2, Min. | 5.3 | 2.9 | 1.0 | 5.0 | 2.8 | 0.8 | 5.3 | 4.2 | 0.8 |
| t90, Minutes | 25.4 | 20.3 | 5.5 | 21.3 | 17.7 | 5.3 | 31.2 | 30.4 | 5.6 |
| t90-t2, Min. | 19.8 | 16.2 | 2.5 | 16.3 | 13.6 | 2.4 | 24.9 | 26.1 | 2.7 |
| % Reversion | 0.0 | 0.0 | is.0 | 0.0 | 0.0 | 13.5 | 0.0 | 0.0 | 13.4 |

TABLE II

| Composition | 1 | 2 | 3 | 4 | 5 | 6 | 7 | 8 | 9 |
|---|---|---|---|---|---|---|---|---|---|
| Stress-Strain Data | | | | | | | | | |
| Tensile, Mpa | 27.1 | 26.6 | 24.4 | 27.6 | 26.8 | 25.0 | 27.2 | 26.6 | 24.8 |
| 100% Modulus, MPa | 3.6 | 4.0 | 5.3 | 4.0 | 4.0 | 5.3 | 3.3 | 3.7 | 4.6 |
| 300% Modulus, MPa | 16.0 | 17.2 | 19.9 | 17.3 | 17.0 | 19.8 | 15.6 | 16.2 | 18.2 |
| % Elongation | 497 | 460 | 376 | 473 | 474 | 390 | 501 | 491 | 407 |
| Shore "A" Hardness | 71 | 71 | 74 | 69 | 72 | 73 | 68 | 71 | 73 |
| Die C Tear @ 24° C. | | | | | | | | | |
| Peak Stress, N/mm | 128.0 | 77.8 | 73.9 | 93.6 | 93.8 | 57.3 | 107.8 | 104.9 | 66.7 |
| Die C Tear @ 100° C. | | | | | | | | | |
| Peak Stress, N/mm | 84.4 | 58.6 | 32.2 | 67.4 | 55.6 | 32.8 | 84.4 | 66.7 | 32.7 |
| Harp Adhesion (Unaged) | | | | | | | | | |
| Peak Stress, N | 406 | 402 | 51 | 467 | 506 | 56 | 407 | 402 | 48 |
| Harp Adhesion (Aged) - 95% Humidity, 10 days @ 85° C. | | | | | | | | | |
| Peak Stress, N | 216 | 368 | 42 | 361 | 382 | 38 | 478 | 487 | 110 |
| Harp Adhesion (Aged) - Salt (5% Nacl) 10 days @ 23° C. | | | | | | | | | |
| Peak Stress, N | 60 | 107 | 32 | 162 | 275 | 39 | 92 | 122 | 22 |

The Mooney Viscometer data show that when used with each of the sulfenamide accelerators the zinc hexasulfide complex shortens scorch times, but not as much as does TMTD. The rheometer data show that both the zinc hexasulfide complex and TMTD were very effective in producing fast early cures, as measured by t25-t2. The TMTD compositions showed significant reversion, a loss of properties on further heating after maximum cure was attained.

The Die C tear data indicate that TMTD produced significantly lower tear-resistance, compared with the zinc hexasulfide complex, and this effect was more pronounced when the test was performed at an elevated temperature. Similarly, harp adhesion results showed very superior unaged and aged performance in the compositions containing the zinc hexasulfide complex, as compared with compositions containing TMTD.

In summary, the data indicate that the zinc hexasulfide complexes were able to provide substantial increases in the cure-rate of all three sulfenamide-accelerated compositions, while mitigating the negative effects seen with the TMTD compositions. This is in addition to eliminating the hazard of using secondary amine compounds, a potential source of nitrosamines.

EXAMPLE 2

To evaluate the use of the compositions of the invention as sulfur-donors in EPDM rubber, a series of compositions was prepared, using the following masterbatch formulation:

| Ingredient | Parts by Weight |
|---|---|
| EPDM - Vistalon ® 5600 | 100 |
| Carbon Black - N-550 | 100 |
| Carbon Black - N-774 | 100 |
| Oil-Sunpar ® 2280 | 110 |
| Antioxidant- FLECTOL ® TMQ | 2 |
| Zinc oxide | 5 |
| Stearic Acid | 2 |
| Accelerator - MBTS | 1.5 |
| Total | 420.5 |

The above materials were mixed in a Banbury mixer to produce a masterbatch, with the MBTS being added on a mill to complete the masterbatch. Various curatives were added to the masterbatch, and the curing behaviour of the resulting compositions was observed, as set forth in Table III.

TABLE III

| Composition | 10 | 11 | 12 | 13 | 14 | 15 | 16 | 17 | 18 | 19 |
|---|---|---|---|---|---|---|---|---|---|---|
| EPDM Master | 420.5 | ---> | | | | | | | | |
| Accelerator-CBS | 1.5 | ---> | | | | | | | | |
| DTDM | — | 3.0 | — | — | — | — | — | — | — | — |
| Rhenocure S/G | — | — | 4.5 | — | — | — | — | — | — | — |
| Complex B | — | — | — | 2.1 | — | — | — | — | — | — |
| Complex C | — | — | — | — | 2.2 | — | — | — | — | — |

TABLE III-continued

| Composition | 10 | 11 | 12 | 13 | 14 | 15 | 16 | 17 | 18 | 19 |
|---|---|---|---|---|---|---|---|---|---|---|
| Complex D | — | — | — | — | — | 3.0 | — | — | — | — |
| Complex E | — | — | — | — | — | — | 2.5 | — | — | — |
| Complex F | — | — | — | — | — | — | — | 2.5 | — | — |
| Complex G | — | — | — | — | — | — | — | — | 2.2 | — |
| Complex H | — | — | — | — | — | — | — | — | — | 2.4 |
| Sulfur | 0.8 | — | — | — | — | — | — | — | — | — |
| ODR @ 160° C. | | | | | | | | | | |
| Max. Torque, dNm | 26.0 | 27.8 | 24.6 | 33.3 | 26.8 | 25.8 | 28.3 | 27.6 | 21.3 | 20.9 |
| Min. Torque, dNm | 4.9 | 4.8 | 4.9 | 5.2 | 5.2 | 5.2 | 5.4 | 5.1 | 5.0 | 5.1 |
| t2, Min. | 5.0 | 8.5 | 6.6 | 2.5 | 2.1 | 2.5 | 1.8 | 2.6 | 3.1 | 2.3 |
| t90, Min. | 18.3 | 16.0 | 15.9 | 14.8 | 11.4 | 10.4 | 8.7 | 15.4 | 8.9 | 11.0 |
| t90-t2, Min. | 13.3 | 7.5 | 9.3 | 12.3 | 9.3 | 7.9 | 6.9 | 12.8 | 5.8 | 8.7 |

Seven different complexes of zinc hexasulfide with an amine were tested, as follows:

| Complex | Amine |
|---|---|
| B | N-Methylimidazole |
| C | 1,2-Dimethylimidazole |
| D | 1-Benzyl-2-methylimidazole |
| E | N-Butylimidazole |
| F | N-3-Aminopropylimidazole |
| G | N-Vinylimidazole |
| H | N-Allylimidazole |

As controls, dithiodimorpholine (DTDM) and caprolactam disulfide, 80% on a polymeric carrier (Rhenocure® S/G), were compared as sulfur donors.

Physical test results are set forth in Table IV.

TABLE IV

| Composition | 10 | 11 | 12 | 13 | 14 | 15 | 16 | 17 | 18 | 19 |
|---|---|---|---|---|---|---|---|---|---|---|
| Stress-strain Data | | | | | | | | | | |
| Cured(t90 + 5 min) @ 160° C. | 10.04 | 10.9 | 10.2 | 12.0 | 10.3 | 9.9 | 10.7 | 10.3 | 9.0 | 8.4 |
| 100% Modulus, MPa | 3.9 | 4.0 | 3.6 | 4.9 | 3.9 | 3.8 | 4.2 | 3.8 | 3.2 | 2.9 |
| 300% Modulus, MPa | 9.5 | 9.8 | 9.0 | 11.5 | 9.5 | 9.2 | 10.0 | 9.6 | 8.0 | 7.5 |
| % Elongation | 408 | 406 | 427 | 312 | 399 | 395 | 396 | 372 | 410 | 407 |
| Shore "A" Hardness | 73 | 74 | 71 | 75 | 72 | 73 | 72 | 73 | 70 | 71 |
| Aged Stress-Strain | | | | | | | | | | |
| Hot Air, 70 hrs.@ 121° C. | | | | | | | | | | |
| Tensile, MPa | 12.5 | 13.0 | 12.1 | 13.0 | 12.4 | 11.8 | 12.7 | 12.3 | 10.2 | 9.6 |
| 100% Modulus, MPa | 5.9 | 6.2 | 5.8 | 7.8 | 5.8 | 5.7 | 6.2 | 6.0 | 4.7 | 4.2 |
| 200% Modulus, MPa | 10.2 | 10.6 | 10.0 | 12.9 | 10.1 | 9.7 | 10.5 | 10.3 | 8.4 | 7.6 |
| % Elongation | 303 | 284 | 287 | 202 | 300 | 290 | 289 | 275 | 322 | 342 |
| Shore "A" Hardness | 75 | 75 | 75 | 74 | 77 | 72 | 76 | 76 | 73 | 74 |
| Compression Set-22 hrs. @ 121° C. | | | | | | | | | | |
| Cured 2 × (t90 + 5 min.) @ 160° C. | | | | | | | | | | |
| % Set | 52 | 58 | 56 | 54 | 56 | 57 | 67 | 52 | 58 | 63 |

EXAMPLE 3

In a similar manner, a master batch was prepared from butyl rubber, according to the following recipe:

| Ingredient | Parts by Weight |
|---|---|
| Butyl Rubber (268) | 100 |
| Carbon Black, N-660 | 60 |
| Oil, Sundex ® 790 | 10 |
| Zinc Oxide | 5 |
| Stearic Acid | 1 |
| Total | 176 |

To this masterbatch were added 1.0 phr MBTS accelerator and 0.5 phr sulfur. Compositions were prepared containing 1.25 phr each of tellurium diethydithiocarbamate (TDEC), CBS, tetraethylthiuram disulfide (TETD), tetrabenzylthiuram disulfide (TB$_z$TD) and Complex A. Rheometer (ODR) data showed that the composition containing Complex A exhibited the highest state of cure (as shown by maximum torque data) and the lowest percent reversion.

EXAMPLE 4

The compositions of the invention were evaluated in a basic natural rubber formulation, compared with known accelerators in the presence of sulfur, and combined with these accelerators in the absence of sulfur, with the zinc hexasulfide/amine complexes functioning as sulfur donors.

The natural rubber formulation ("NR master") was mixed from the following ingredients:

| Ingredient | Parts by Weight |
|---|---|
| Natural Rubber - SMR-CV60 | 100.0 |
| Carbon Black - N330 | 50.0 |
| Oil - Flexon 580 | 5.0 |
| Zinc Oxide | 5.0 |
| Stearic Acid | 2.0 |
| Total | 162.0 |

Accelerators (CBS, MBS and TBSI) were compared, as well as Complex A, with and without sulfur, with proportions and test data as set forth in Table V.

Compositions 20, 21 and 22 are comparative examples, showing the use of sulfur and conventional accelerators. Compositions 23 and 27 are outside the scope of the invention because they contain the zinc hexasulfide-amine complex without a co-agent. Compositions 24, 25 and 26 are within the scope of the invention showing the use of the zinc hexasulfide-amine complex together with an accelerator co-agent, in the absence of sulfur.

The test data show that compositions 23 and 27 (outside the scope of the invention) vulcanize at a significantly slower rate and show significantly poorer stress-strain properties, compared with comparative compositions 20, 21 and 22 or the compositions the invention, 24, 25 and 26.

TABLE V

| Composition | 20 | 21 | 22 | 23 | 24 | 25 | 26 | 27 |
|---|---|---|---|---|---|---|---|---|
| NR Master | 162.0 | → | → | → | → | → | → | → |
| Sulfur | 0.8 | 0.8 | 0.8 | 0.8 | — | — | — | — |
| CBS | 1.5 | — | — | — | 1.5 | — | — | — |
| MOR | — | 1.5 | — | — | — | 1.5 | — | — |
| TBSI | — | — | 1.5 | — | — | — | 1.5 | — |
| Complex A | — | — | — | 1.5 | 1.9 | 1.9 | 1.9 | 1.9 |
| Mooney Scorch @ 121° C. | | | | | | | | |
| Min. Visc. | 20.8 | 23.1 | 23.8 | 25.6 | 29.6 | 26.5 | 26.0 | 25.8 |
| t5, Min. | 42.2 | 69.2 | 64.7 | 10.4 | 3.7 | 4.9 | 6.1 | 10.2 |
| t35, Min. | 44.8 | 78.4 | 88.9 | 27.9 | 6.3 | 8.5 | 11.2 | 30.8 |
| Rheometer @ 150° C. | | | | | | | | |
| Max. Torque, dNm | 29.4 | 30.8 | 31.4 | 23.8 | 33.9 | 33.3 | 32.6 | 17.4 |
| Min. Torque, dNm | 3.2 | 3.7 | 3.8 | 3.6 | 3.9 | 3.6 | 3.8 | 3.7 |
| t2, Min. | 7.0 | 9.8 | 8.9 | 3.1 | 2.3 | 2.3 | 2.5 | 3.4 |
| t90, Min. | 10.0 | 15.7 | 20.2 | 24.5 | 4.7 | 6.3 | 9.2 | 19.8 |
| t90–t2, Min. | 3.0 | 5.9 | 11.3 | 21.4 | 2.4 | 4.0 | 6.7 | 16.4 |
| % Reversion | 4.5 | 3.7 | 3.2 | 14.3 | 7.5 | 7.1 | 4.3 | 21.5 |
| Stress-Strain Cured (t90 + 5 min.) @ 150° C. | | | | | | | | |
| Tensile, MPa | 25.7 | 26.1 | 25.2 | 18.3 | 25.6 | 26.7 | 24.4 | 14.5 |
| 100% Modulus, MPa | 2.2 | 2.4 | 2.3 | 1.8 | 2.6 | 2.6 | 2.3 | 1.2 |
| 300% Modulus, MPa | 11.3 | 12.4 | 11.8 | 9.0 | 12.8 | 12.4 | 11.6 | 6.4 |
| % Elongation | 577 | 550 | 531 | 495 | 517 | 550 | 518 | 520 |
| Shore A Hardness | 57 | 57 | 56 | 52 | 58 | 58 | 57 | 46 |

EXAMPLE 5

To evaluate other amines as complexing agents for zinc hexasulfide, a series of compositions was prepared and tested. The following complexes were incorporated into the test compositions:

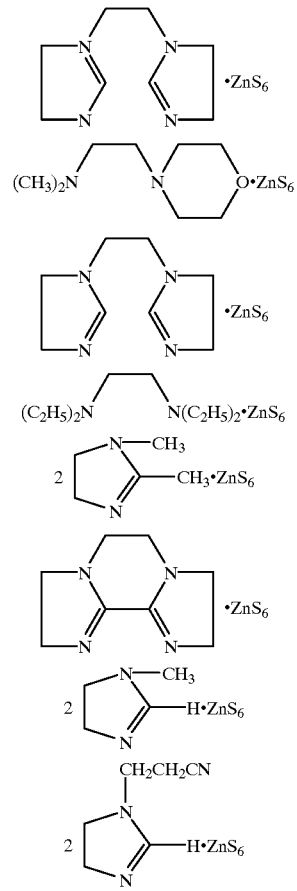

All of the compositions showed favorable vulcanization behavior.

EXAMPLE 6

To demonstrate the effectiveness of the compositions of the invention when the rubber is in latex form, a complex of zinc hexasulfide and TMEDA was compared with DTDM in natural latex formulations without sulfur. Both compositions contained zinc oxide, an antioxidant, 0.5 phr of ZDBC and 1.5 phr of ZMBT. The zinc hexasulfide/TMEDA complex and the DTDM were each used at 2 phr.

After mixing, casting of a film and drying, the compositions were tested for vulcanization characteristics using a Moving Die Rheometer (Alpha Technologies) operating at 0.5° arc at temperatures of 100° and 140° C. In both instances, the compositions containing the zinc hexasulfide/TMEDA complex outperformed those containing DTDM, both in rate of cure and in state of cure (as measured by maximum rheometer torque).

We claim:

1. A vulcanizable rubber composition comprising
    A) 100 parts by weight of vulcanizable rubber,
    B) from 0.01 to 10 parts by weight of a complex of zinc hexasulfide and an amine of from 3 to 24 carbon atoms, and
    C) from 0.1 to 10 parts by weight of a co-agent which is one or more accelerators of rubber vulcanization.

2. The composition of claim 1 wherein sulfur is also present, in an amount of from about 0.1 to about 5.0 parts by weight.

3. The composition of claim 1 wherein C) is a sulfenamide or sulfenimide accelerator.

4. The composition of claim 3 wherein the accelerator is selected from the group consisting of 2-(4-morpholinothio) benzothiazole, N-t-butyl-2-benzothiazolesulfenamide, N-cyclohexyl-2-benzothiazolylsulfenamide, N-t-butyl-N,N-di(2-benzothiazolyl)sulfenimide, N,N-dicyclohexyl-2-benzothiazolesulfenamide, and mixtures thereof.

5. The composition of claim 3 wherein C) is a sulfenamide or sulfenimide of a heterocycle selected from the group consisting of triazinyl, pyridyl, pyrimidyl, pyrazyl, pyridazyl, quinolyl and lepidyl.

6. The composition of claim 1 wherein the rubber is selected from the group consisting of natural rubber, polyisoprene, polybutadiene, styrene-butadiene rubber, ethylene-propylene diene copolymer, and blends of two or more of them.

7. The composition of claim 1 wherein B) is a complex of zinc hexasulfide and an amine selected from the group consisting of N,N,N',N'-tetramethylethylenediamine, 1,1,3,3-tetramethylguanidine, 1-butylimidazole, 1,2-dipiperidinoethane, 1,2-dimorpholinoethane, 1,2-di-(N-methylpiperazino)ethane, N-methylimidazole, 1-benzyl-2-methylimidazole, 1,2-dimethylimidazole, N-butylimidazole, N-3-aminopropylimidazole, N-vinylimidazole, N-cyclohexyl-N',N',N'',N''-tetramethylguanidine, 4-dimethylaminopyridine and mixtures thereof.

8. The composition of claim 1 wherein
    A) is natural rubber, polyisoprene, polybutadiene, styrene-butadiene rubber, ethylene-propylene diene copolymer, or a mixture of two or more of them,
    B) is a complex of zinc hexasulfide with an amine selected from the group consisting of N,N,N',N'-tetramethylethylenediamine, 1,1,3,3-tetramethylguanidine, 1-butylimidazole, 1,2-dipiperidinoethane, 1,2-dimorpholinoethane, 1,2-di-(N-methyl-piperazino)ethane, N-methylimidazole, 1-benzyl-2-methylimidazole, 1,2-dimethylimidazole, N-butylimidazole, N-3-aminopropylimidazole, N-vinylimidazole, N-cyclohexyl-N',N',N'',N''-tetramethylguanidine, and 4-dimethylaminopyridine and
    C) is a sulfenamide accelerator.

9. The composition of claim 8 also containing zinc oxide, stearic acid, an antidegradant, a reinforcing agent selected from carbon black and silica, and an extending oil.

10. Vulcanized compositions of claim 9.

11. The composition of claim 1 wherein B) is present in an amount of from 0.1 to 5.0 parts by weight, and C) is present in an amount of from 0.5 to 5 parts by weight.

12. The composition of claim 8 wherein B) is present in an amount of from 0.1 to 5.0 parts by weight, and C) is present in an amount of from 0.5 to 5 parts by weight.

13. The composition of claim 1 wherein A) is butyl rubber, chlorobutyl rubber or acrylonitrile-butadiene rubber.

14. The composition of claim 1 wherein A) is in latex form.

* * * * *